United States Patent [19]

Ekhoff

[11] Patent Number: 4,862,302
[45] Date of Patent: Aug. 29, 1989

[54] AIR BLADDER APPARATUS FOR POSITIONING A MAGNETIC HEAD

[76] Inventor: Donald L. Ekhoff, 1600 Day Rd., Gilroy, Calif. 95020

[21] Appl. No.: 199,611

[22] Filed: May 27, 1988

[51] Int. Cl.$^4$ .................. G11B 5/54; G11B 21/12; G11B 21/22
[52] U.S. Cl. .................... 360/105; 360/104
[58] Field of Search .................. 360/105, 104

[56] References Cited

U.S. PATENT DOCUMENTS

| | | | |
|---|---|---|---|
| 3,984,873 | 10/1976 | Pejcha | 360/105 |
| 4,400,749 | 8/1983 | Franke et al. | 360/105 |
| 4,703,375 | 10/1987 | Chan et al. | 360/105 |
| 4,703,376 | 10/1987 | Edwards et al. | 360/105 |

Primary Examiner—Robert S. Tupper
Attorney, Agent, or Firm—Thomas Schneck

[57] ABSTRACT

In an actuator for the recording and reading of information on a magnetic memory disk of the type having a pair of flexures suspended from a support arm, a low mass pneumatic apparatus for bringing a magnetic head into proximity with a disk. The support arm includes upper and lower bodies which are spaced apart to straddle a magnetic memory disk. Each of the support arm bodies is fixed to one end of a flexure. The end of each flexure opposite the support arm bodies has a read/write head. The flexures and heads are spring biased into an unload position away from the magnetic memory disk. Independent gas impermeable elastic bladders are operatively coupled to the support arm bodies and the flexure members to exert a force which bends the flexures relative to the support arm. Expansion of the elastic bladders provide a force which exceeds the spring biasing, thereby moving the heads into a load position in data transfer engagement with the magnetic disk. The elastic bladders and the head suspension assembly provide a low mass load-unload device.

18 Claims, 2 Drawing Sheets

AIR BLADDER APPARATUS FOR POSITIONING A MAGNETIC HEAD

DESCRIPTION

TECHNICAL FIELD

The present invention relates generally to apparatus for information recording and reproducing on a magnetic memory disk and relates particularly to devices for fine positioning of a magnetic head relative to a magnetic memory disk whereby the head is brought into and out of magnetic communication with the disk.

BACKGROUND ART

In magnetic memory disks, information is recorded in concentric tracks on both sides of a disk. Read/write heads are moved to a particular track to gain access to the information recorded in that track. The tracks on a side of a magnetic disk are extremely closely fit, making it difficult to meet the requirement for high-speed movement of a read/write head. Head movement may be considered in two aspects: (1) track seeking and location; (2) movement into or out of a magnetic flux coupling relation with the disk surface on a track. The present invention deals mainly with the second aspect, but this aspect has an effect on the first aspect. Requirement of head movement within a 15 microsecond time window is typical for both aspects.

Track seeking is often provided by a linear actuator which moves the heads radially along the disk. Thus, the heads and the carriage which supports the heads move across the disk in a straight line manner. Rotary actuators are also used for track seeking. A rotary actuator mounts the heads at the end of an arm assembly which is pivoted at an end opposite the heads. The heads are then moved about the maximum radius of the apparatus so that higher acceleration can be gained for quick access to the desired information. Moreover, the end of the arm supporting the heads presents less inertial resistance to movement, thereby permitting rapid acceleration between positions. The present invention may be used with either type of actuator.

In the recordation of data on the disk, read/write heads are brought into data transfer engagement with opposed surfaces of the memory disk, by close spacing of the head to the disk, so that magnetic flux from the head can influence magnetic domains on the disk. Information is then recorded in various tracks on the opposed surfaces. Rapid acceleration and deceleration is imperative since head movement must take place within a specific time window. Simultaneously, accuracy is critical because the heads must be positioned and then repositioned at the same spot with a high degree of repeatability. During repositioning of the read/write heads, the heads are supported on the disk by a film of air which prevents contact between the heads and the disk. Direct contact of the disk with a head may result in damage to either or both of the head and disk, as well a loss of information. The film of air acts as an air cushion for a head and results from rotation of the disk at high speeds. After verifying that a magnetic memory disk will accept information, the read/write heads are removed from the disk into an unload position.

Assemblies for loading and unloading of magnetic heads are known. The terms "loading" and "unloading" mean bringing the head into and out of magnetic communication with the disk so that data can be read or written. This operation can be separate from or simultaneous with a track seeking operation. Typically, load-unload assemblies in large drives utilize a position slidably fit within an air cylinder. A danger which must be addressed in all load-unload assemblies is that of head crash with the magnetic disk. Dampening devices are therefore used to control the speed at which a head approaches a magnetic disk.

It is not uncommon in actuators to find that movement of a read/write head requires displacement of not only the head but also the carriage, a load-unload piston and cylinder assembly, and a dampening device. Movement of a large mass, however, is not advantageous to optimal operation of an actuator. A large mass provides an inertial resistance that inhibits rapid acceleration and deceleration and track-to-track repositioning of the read/write head. Moreover, an increase in mass leads to an increase in the occurrence of ringing, i.e. oscillation of the heads following deceleration. Ringing is detrimental to the efforts to minimize the time required for head repositioning.

The object of the present invention is to provide an actuator to be used in memory disk operations which significantly reduces the mass that must be displaced in track-to-track repositioning of a read/write head. Another object is to provide such an actuator having a load-unload device that reduces the risk of head crash.

DISCLOSURE OF THE INVENTION

The above objects have been met by a rotary actuator having a load-unload device which is actuated by a light-weight elastomeric member. Thus, the need of a metallic piston and cylinder assembly or a cam assembly to pivot a read/write head relative to a magnetic disc has been eliminated.

The actuator includes a support arm, or carriage, pivotally fixed to an actuator housing. The support arm has upper and lower longitudinal bodies spaced apart to straddle a magnetic memory disk. Each of the bodies includes a head suspension assembly having a read/write head fixed to an end of a flexure member. The read/write heads have opposite orientations to read opposed sides of the magnetic memory disk.

The flexure members are fitted to a hinged segment of an associated longitudinal body. Gas impermeable elastic pneumatic bladders are positioned such that when inflated a bladder will cause pivoting of the hinged segment to bring a read/write head into data transfer engagement with the magnetic memory disk, i.e. the head is brought into close proximity with the surface of the disk to the extent that magnetic communication with domains of the disk material is now possible. Inflation of a bladder moves a head and an associated head suspension assembly into a load position. A return spring biases the hinged segment into an unload position so that the head is removed from the magnetic memory disk when a bladder is deflated. The flexure members are made of a resilient material and are bent by a lift wire during loading of the read/write head. The resilient flexure members have an elasticity to maintain a predetermined gram load force on a magnetic disk when in a load position.

An advantage of the present invention is that the load-unload device has a low mass, thereby decreasing the risk of head bounce during loading, and reducing the inertial resistance to rapid acceleration and deceleration of a support arm. Such a device is less likely to cause head crashes which result in data loss and which lessen the potential life of a disk and head. Another advantage of the present invention is that, unlike piston-and-cylinder assemblies, the gas impermeable elastic bladders do not require lubrication which if leaked onto a disk would damage the system.

BEST MODE FOR CARRYING OUT THE INVENTION

Figure 1:
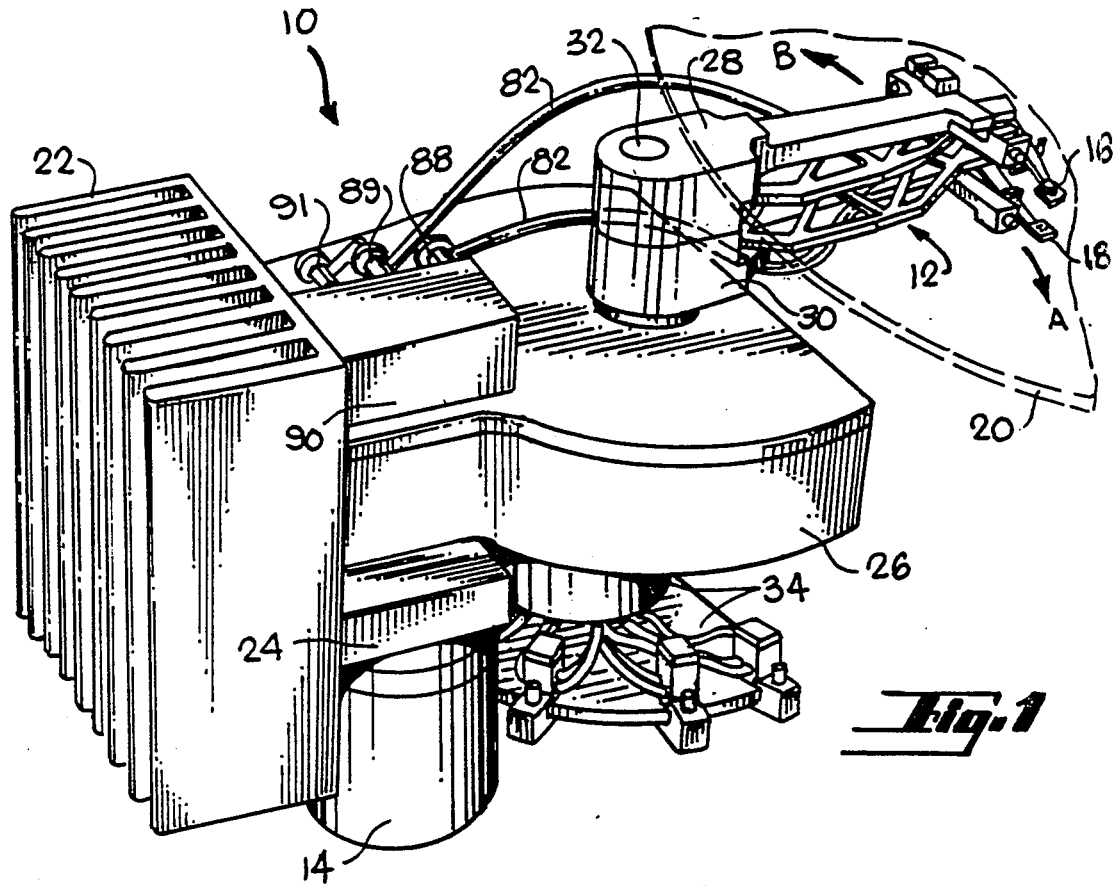
FIG. 1 is a perspective view of a rotary actuator in accord with the present invention.
Figure 2:
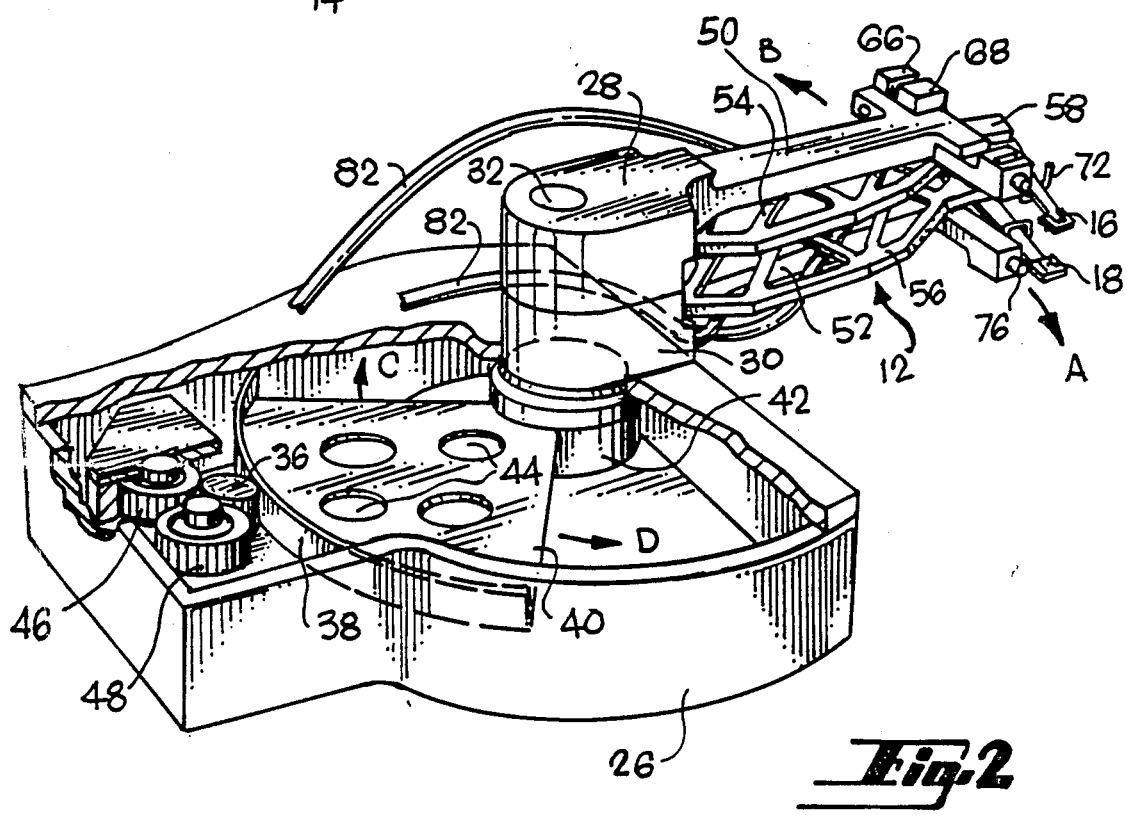
FIG. 2 is a perspective, partially cut away view of the drive assembly of FIG. 1.

With reference to FIGS. 1 and 2, a rotary actuator 10 is shown having a rotary arm 12 and a stepper motor 14 for reciprocating motion of the rotary arm. While a rotary actuator is shown, the present invention is also applicable to linear actuators. Movement of the rotary arm 12 displaces read/write heads 16 and 18 along an arcuate path to read opposite sides of a magnetic memory disk 20. A stepper or servo-controlled motor 14 is capable of highly accurate positioning, typically moving at 25,000 steps per revolution and as many as 50,000 steps per revolution. The motor is reversible to permit movement of the rotary arm 12 in either the direction of Arrow A or of Arrow B. A heat sink 22 having a plurality of fins is included to dissipate heat, thereby reducing the risk of inaccuracies that are due to metal expansion. The motor 14 is mounted to a metal block 24 at the lower surface of a housing 26. The rotary arm is pivotally fixed to the housing 26 and includes upper and lower support bodies 28 and 30 to enable the read/write heads 16 and 18 to straddle the disk 20. The heads are opposite in orientation to enable reading of opposed disk surfaces. The support bodies 28 and 30 have a common shaft 32 at an end distal the heads 16 and 18. Operation of the motor 14 causes the support bodies to pivot about the center of shaft 32. An optical encoder 34 or the like is used to verify the positional accuracy of the heads.

The motor 14 powers a drive roller 36. The circumferential periphery of the drive roller 36 is in frictional contact with an arcuate outer edge 38 of a motion transfer wheel segment 40. A hub 42 is integral the wheel segment 40 so that motion of the wheel segment translated to the rotary arm 12 via the common shaft 32. The motion transfer wheel segment 40 receives reciprocating motion, as shown by arrows C and D. Holes 44 in the wheel segment are included to reduce inertia.

In most applications a drive roller is supported in place by a bearing assembly. As shown in Fig. 2, however, the present invention eliminates the use of a bearing assembly. Such assemblies, by necessity, include a spatial tolerance which would not be advantageous to the operation of the rotary actuator 10 since movements of the drive roller 36 would then result in a decrease in positioning accuracy of the read/write heads. However, by trapping the drive roller 36 between a pair of freespinning pressure wheels 46 and 48, the drive roller 36 is captured in position against the arcuate outer edge 38. The bearingless drive roller provides a greater degree of accuracy and repeatability in the displacement of the read/write head.

The free-spinning pressure wheels 46 and 48 include bearing assemblies and, therefore, are associated with spatial tolerances. However, unlike a positional movement of a drive roller, movement of the pressure wheels does not result in inaccuracies of a read/write head. Should the pressure wheels move, both will continue to exert a component of force upon the drive roller 36 that will capture the drive roller against the motion transfer wheel segment 40. It has been discovered that the triangular configuration of rollers 36, 46 and 48 limits a rotary actuator to an absolute and non-accumulative error of 0.00002 inches in either single step or mult--step functions, at the end of a four-inch arm. Thus, it is possible to employ the rotary actuator 10 for use in memory disk testing and to incorporate incremental stepping functions to simulate disk drive characteristics with extreme accuracy and repeatability of positions.

The bearingless drive roller 36 permits the stepper motor 14 to be removed from the axis of rotation of the rotary arm 12. By controlling the motion transfer wheel segment 40 rather than directly rotating the rotary arm 12, a greater amount or torque is provided for rapid acceleration and deceleration of the rotary arm without a corresponding loss in positional accuracy.

Figure 3:
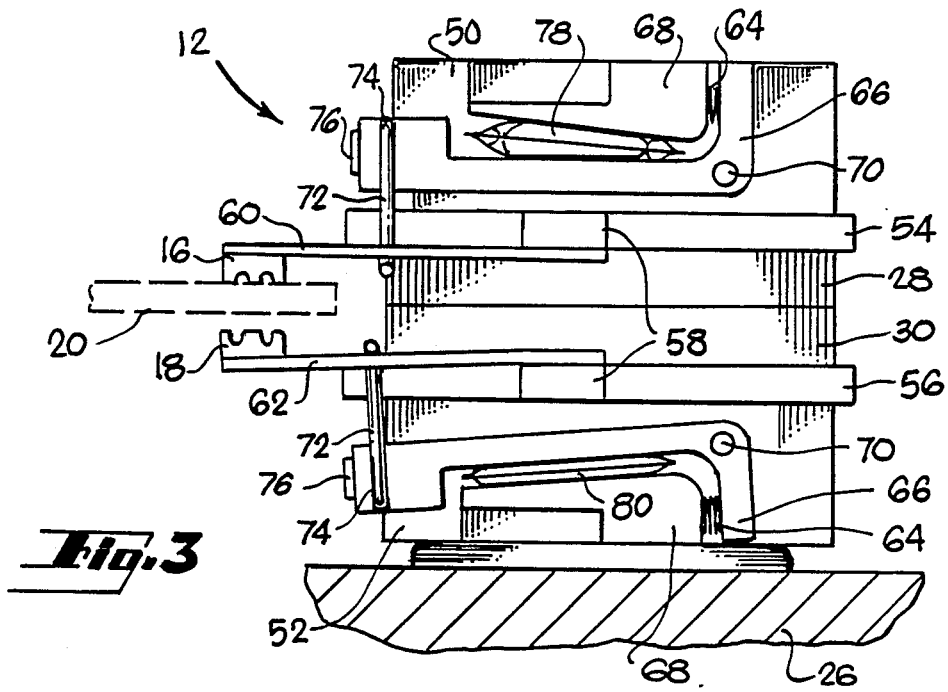
FIG. 3 is a side view of the load-unload device of FIG. 1.
Figure 4:
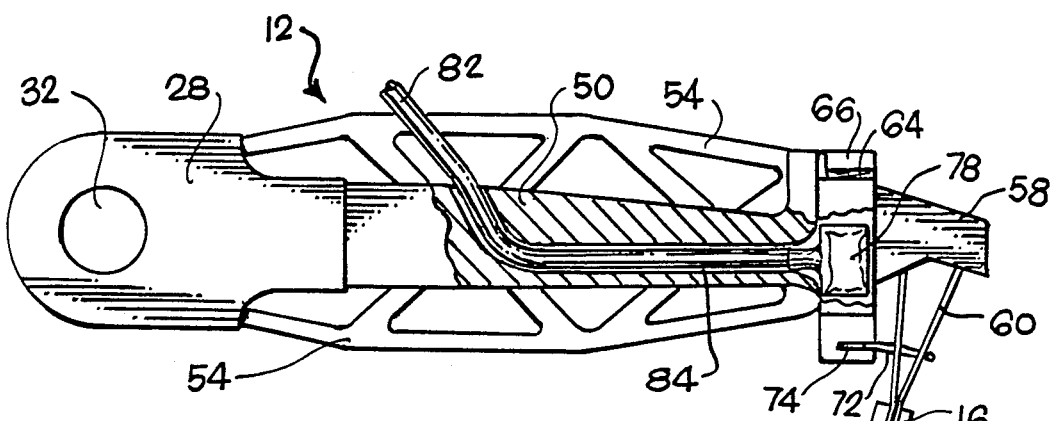
FIG. 4 is a top partially cut away view of the device of FIG. 3.

Referring now to FIGS. 2-4, the upper and the lower support bodies 28 and 30 of the rotary arm 12 each include a T-shaped extension 50 and 52 and a truss plate 54 and 56. The truss plates 54 and 56 have variously shaped cutaway portions to minimize the mass of the truss plates. A truss plate includes a mounting sector 58 which projects beyond the length of the associated T-shaped extension 50 and 52.

FIG. 3 illustrates an upper read/write head 16 in a load position, while the lower read/write head is in an unload position. The load position of head 16 brings the head in data transfer engagement with the magnetic memory disk 20. The heads 16 and 18 are moved between the load and unload position by the bending of flexures 60 and 62, shown in FIGS. 3 and 4. Each of the flexures 60 and 62 have a first end fixed to the mounting sector 58 of a truss plate 54 and 56. The end of a flexure opposite the mounting sector 58 supports a head 16 and 18. In a relaxed state flexure 60 permits the upper read/write head to extend to the magnetic memory disk 20. The flexure 60 is made of a resilient material having an elasticity to provide a predetermined gram load force in the direction of the magnetic memory disk 20.

In the bent state, flexure 62 removes the lower read/write head 18 from the magnetic memory disk 20. The heads 16 and 18 are biased into an unload position by return springs 64. The return springs 64 exert a force to pivot a hinged segment 66 of the T-shaped extensions 50 and 52. The hinged segments 66 pivot relative to a stationary segment 68 at a pivot pin 70. Movement of a hinged section 66 is followed by a lift wire 72 that contacts a flexure 60 and 62. Pivoting of the hinged segment 66 will therefore result in bending or relaxing of the flexure. A lift wire is received in a slot 74 in the hinged segment, and is then tightened into position by clamping screw 76.

While the rest condition of a hinged segment 66 is shown to be one which places a read/write head 16 and 18 into an unload position, this is not critical to the present invention. The heads may be biased into a rest condition of head loading.

The bias of a return spring 64 is selectively overcome by inflation of a gas impermeable elastic bladder 78 and 80. A bladder is made of a material which is light weight so that the bladder adds little to the mass of the rotary arm. Typically, the bladder is made of an elastomeric material. A pneumatic hose 82 is fitted through a recess 84 in a T-shaped extension 50 and 52 of the rotary arm. Supply of a gas, preferably air, to an elastic bladder 78 and 80 via the pneumatic hose 82 results in expansion of the bladder.

Figure 5:
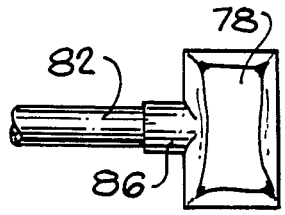
FIG. 5 is a top view of the bladder of FIG. 4.
Figure 6:
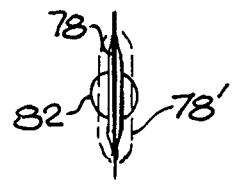
FIG. 6 is a front view of the bladder of FIG. 5.

Construction of a bladder 78 is best shown in FIGS. 5 and 6. An inflatable bladder 78 is approximately 0.4 cm in length and 1 cm in width. The tail of the bladder 78 includes a nippled opening 86 which fits about the pneumatic hose 82. When inflated a bladder expands to approximately ten times the original height. A partially inflated bladder 78' is shown in FIG. 6.

Referring now to FIGS. 1 and 3, the inflation of an elastic bladder 78 and 80 is via throttling needle valves 88 and 89 attached to the side of an air chamber housing 90 atop the actuator housing 26. A master needle valve 91 permits air flow from a pressure source, not shown, to an air chamber within the housing 90. Air flow directly from a pressure source to the pneumatic hoses could result in damage to a disk since the volume of air needed to move a read/write head from an unload position to a load position in communication with the disk is extremely small. This risk is removed by requiring the pressure source to supply air to the volume of the air chamber as well as the pneumatic hoses 82 and elastic bladders 78 and 80.

In operation, a rotary actuator 10 for the quality control testing of a magnetic memory disk is associated with a disk drive, not shown. The disk drive provides rotation for the magnetic memory disk 20. The electric stepper motor 14 of the rotary actuator 10 pivots the rotary arm 12 to move the read/write heads 16 and 18 along an arcuate path. The upper and lower support bodies 28 and 30 of the rotary arm straddle the magnetic memory disk so that the heads may be brought into data transfer engagement with the opposed surfaces of the disk. The initial movement of the rotary arm is accomplished with the heads in an unload position away from the disk. However, once properly situated the heads may be moved into a loaded position by inflation of one or both of the elastic bladders 78 and 80. The load-unload bladder assemblies permit individual control of the heads 16 and 18. After loading, track-to-track repositioning of a head is performed while the head rides on a film of air which acts as a cushion. Speed and positional accuracy are critical to such repositioning, but the radial motion of the arm is controlled in a known manner.

The speed at which a read/write head 16 and 18 is loaded onto a magnetic memory disk 20 is controlled by needle valves 88, 89 and 91. Thus, the risk of head bounce is significantly reduced. Moreover, the bladders do not require lubrication such as that found in piston-and-cylinder assemblies. "Blow-by" situations in which a lubricating oil leaks along the walls of a cylinder past a piston will, therefore, not occur.

Most importantly, the inflatable bladder 78 and 80 provide a low mass load-unload device. The mass which must be relocated in track-to-track repositioning of magnetic heads is of great importance to rapid acceleration and deceleration of the heads and associated carriage.

The rest position of a read/write head 16 and 18 is determined by the biasing of return spring 64. A hinged segment 66 is biased to exert a force on flexure 62 via lift wire 72. The return spring 64 consequently creates a rest position in which a head 16 and 18 is held away from the magnetic memory disk. Inflation of an elastic bladder expands the bladder to pivot the hinged segment 66 at pivot pin 70. The flexure 60 and 62 is allowed to proceed to a relaxed condition placing the associated head in data transfer with the magnetic memory disk. Subsequent deflation of a bladder again bends the flexure into an unloaded position.

While the illustrations show a head suspension which is normally biased in an unloaded position, it is understood that the present invention may be used with actuators wherein the rest condition is one that loads a head. Moreover, the inflatable bladders may be used with actuators other than rotary actuators, and may act directly upon read/write heads rather than causing head movement by action upon the structural elements illustrated in the drawings and described above. For example, an inflatable bladder may be positioned between a head 16 and a flexure 60.

I claim:

1. A magnetic head load-unload device for use with an actuator in the recording and reading of information on a magnetic disk, comprising,
   a support arm,
   means for suspending a transducer from said support arm,
   a transducer coupled to said suspension means, said transducer having a load position and an unload position relative to said support arm, movement of said transducer from said unload position to said load position having the effect of placing to said load position having the effect of placing the transducer in data transfer engagement with a magnetic disk,
   biasing means for exerting a force with relation to said suspension means in a manner to urge said transducer into one of said load and unload positions,
   an elastically expandable pneumatic bladder operatively coupled to said biasing means such that expansion of said pneumatic bladder provides a of said pneumatic bladder providing a force to overcome said biasing means, thereby moving said transducer to the other of said load and unload positions, and
   gas supply means for selectively inflating said pneumatic bladder.

2. The device of claim 1 wherein said biasing means exerts a force to urge said transducer into an unload position and expansion of said pneumatic bladder provides a load force sufficient to overcome the force of said biasing means.

3. The device of claim 1 wherein said transducer is a first transducer and said bladder is a first pneumatic bladder said device further comprising a second pneumatic bladder and a second transducer pivotally attached to said support arm and biased into an unload position relative to said support arm, said second transducer having an orientation opposite the orientation of said first transducer, said second pneumatic bladder in transition transfer engagement with said second transducer.

4. The device of claim 1 wherein said biasing means is a return spring.

5. The device of claim 1 wherein said transducer is fixed to a resilient suspension flexure attached to said support arm, said resilient suspension flexure having an elasticity to maintain a predetermined gram load force on said magnetic disk when said transducer is in a load position.

6. The device of claim 1 wherein said support arm is pivotally connected to a rotary actuator housing, whereby pivoting of said support arm moves said transducer along an arcuate path.

7. A magnetic head load-unload device for use with an actuator in recording and reading of information on a magnetic disk, comprising,
a support arm,
a head suspension assembly attached to said support arm,
a read/write head fixed to said head suspension assembly,
biasing means for exerting a force on said head suspension assembly to urge said head suspension assembly to pivot into a rest condition with respect to said support arm, said rest condition being one of a load position in which said read/write head is in data transfer engagement with a magnetic disk, having an unload position, removed from said data transfer engement,
a gas impermeable expandable ladder operatively coupled to said support arm and said head suspension assembly to displace said head suspension assembly relative to said support arm, expansion of said bladder having a force to pivot said head suspension assembly from said rest condition, and
gas supply means for selectively inflating said bladder.

8. The device of claim 7 wherein said head suspension assembly includes a resilient flexure member hinged to said support arm, said flexure member made of a material having an elasticity to maintain a predetermined gram load force on said magnetic disk when said read/write head is in a load position.

9. The device of claim 7 wherein said biasing means is a return spring operatively coupled to said support arm and said head suspension assembly to urge said head suspension assembly into said unload position.

10. The device of claim 7 wherein said read/write head is a first read/write head and said bladder is a first bladder, said device further comprising a second bladder and a second read/write head pivotally attached to said support arm and biased into an unload position relative to said support arm, said second read/write head having an orientation opposite the orientation of said first read/write head, said second bladder in transition transfer engagement with said second read/write head.

11. The device of claim 7 wherein said gas supply means provides a supply of air in the range of 12 psi to 30 psi.

12. The device of claim 8 wherein said head suspension assembly includes a lift wire and wherein said support arm includes a stationary segment and a hinged segment pivotally attached to said stationary segment, said lift wire having a first end attached to said hinged segment and having a second end- in motion transfer communication with said flexure member, said bladder disposed such that expansion of the bladder pivots said hinged segment to bend the flexure member into a load position.

13. The device of claim 7 wherein said support arm is pivotally connected to a rotary actuator housing, whereby pivoting of said support arm moves said read/write head along an arcuate path.

14. An actuator for recording and reading of information on a magnetic disk comprising,
an actuator housing,
a support arm fixed to said actuator housing for movement within a horizontal plane, said support arm having upper and lower longitudinally extending bodies spaced apart at one end to straddle a magnetic disk,
a first head suspension assembly attached to said upper body of the support arm,
a first read/write head fixed to said first head suspension assembly, said first head suspension assembly having a load position in which said first read/write head is in data transfer engagement with said magnetic disk and having an unload position, said first head suspension assembly biased into said unload position,
a first gas impermeable elastic bladder operatively coupled to said support arm and said head suspension assembly to exert a force displacing said first suspension assembly relative to said support arm, expansion of said first elastic bladder providing a force exceeding the bias of said first head suspension assembly, thereby moving said first head suspension assembly into said load position,
a second head suspension assembly attached to said lower body and having a load position relative to said support arm and to said magnetic disk, said second head suspension assembly biased in an unload position,
a second read/write head fixed to said second head suspension assembly in an orientation opposite the orientation of said first read/write head,
a second gas impermeable elastic bladder operatively coupled to said support arm and said second head suspension assembly to exert a force displacing said second head suspension assembly relative to said support arm, expansion of said second elastic bladder providing a force exceeding the bias of said second head suspension assembly, thereby moving said second head assembly into said load position, and
gas supply means for selectively and independently inflating said first and second elastic bladders.

15. The actuator of claim 14 wherein said first and second head suspension assemblies each include a flexure and a lift wire and wherein said upper and lower bodies of the support arm each include a stationary segment and a hinged segment pivotally attached to the stationary segment, said lift wire connected at a first end to said hinged segment and attached at a second end to said flexure, the associated elastic bladder disposed such that expansion of the elastic bladder pivots at hinge segment to bend the flexure into a load position.

16. The actuator of claim 14 wherein said support arm is a rotary support arm pivotally coupled to said actuator housing.

17. The actuator of claim 15 wherein said hinged segments are biased in spaced apart relation to said stationary segments.

18. The actuator of claim 15 wherein said flexures are made of a material having an elasticity to maintain a predetermined gram load force on said magnetic disk.

* * * * *

UNITED STATES PATENT AND TRADEMARK OFFICE
CERTIFICATE OF CORRECTION

PATENT NO. : 4,862,302

DATED : August 29, 1989

INVENTOR(S) : Donald L. Ekhoff

It is certified that error appears in the above-identified patent and that said Letters Patent is hereby corrected as shown below:

On the title page:
[76] Inventor, "1600 Day Rd.," should read -- 2600 Day Rd., --.

Column 3, lines 52-53, "wheel segment translated" should read
-- wheel segment rotates the hub 42. This rotation of the hub is translated --.

Column 4, line 14, "mult- -step" should read -- multi-step --.

Claim 1, column 6, line 35, delete the whole line 35 with the words "load position having the effect of placing to said".

Claim 1, column 6, lines 45-46, "provides a of said said pneumatic bladder providing a force" should read
-- provides a force --.

Claim 3, column 6, line 59, "bladder said" should read
-- bladder, said --.

Claim 5, column 7, line 1, "claim 1" should read
-- claim 2 --.

UNITED STATES PATENT AND TRADEMARK OFFICE
CERTIFICATE OF CORRECTION

PATENT NO. : 4,862,302

DATED : August 29, 1989

INVENTOR(S) : Donald L. Ekhoff

It is certified that error appears in the above-identified patent and that said Letters Patent is hereby corrected as shown below:

Claim 7, column 7, line 25, "having an unload position, removed" should read - - and an unload position removed - -.

Claim 7, column 7, line 26, "engement" should read - - engagement - -.

Claim 7, column 7, line 27, "ladder" should read - - bladder - -.

Signed and Sealed this

Eighteenth Day of September, 1990

Attest:

HARRY F. MANBECK, JR.

*Attesting Officer*    *Commissioner of Patents and Trademarks*